(No Model.)
R. H. MEAD.
SUBIRRIGATION CONDUIT.
No. 584,886. Patented June 22, 1897.
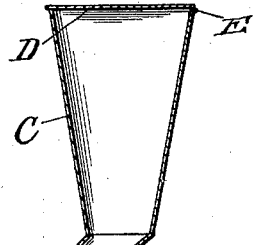
*Fig. 1.*
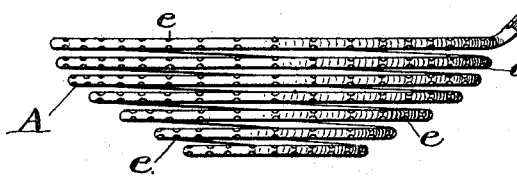
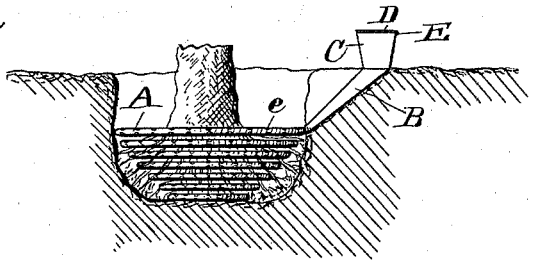
*Fig. 2.*
*Fig. 3.*
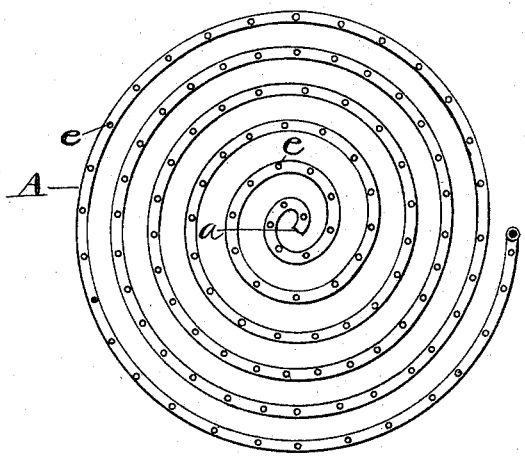
Witnesses
Jos. F. Blackwood
Orlando B. Lester
Inventor
Richard Homer Mead
by D. A. Gowick
Attorney

UNITED STATES PATENT OFFICE.

RICHARD HOMER MEAD, OF CAMDEN, ILLINOIS.

SUBIRRIGATION-CONDUIT.

SPECIFICATION forming part of Letters Patent No. 584,886, dated June 22, 1897.

Application filed January 22, 1897. Serial No. 620,266. (No model.)

*To all whom it may concern:*

Be it known that I, RICHARD HOMER MEAD, a citizen of the United States, residing at Camden, in the county of Schuyler and State of Illinois, have made certain new and useful Improvements in Subirrigation-Conduits, of which the following is a specification.

My invention relates to subirrigation, and more particularly to conduits for supplying the roots of trees, shrubs, and plants with water, and has for its object to provide a simple and efficient means for conducting and applying the water directly to the roots at the point where they rest in the earth when transplanted or when propagated from seeds or cuttings.

Heretofore where running water could not be had or used trees, shrubs, and plants have usually been watered by applying the water to the earth at or near the surface and leaving it to percolate toward or to the roots or by sinking a perforated tube at a distance from the body of the tree, shrub, or plant and pouring water into the tube at its top. In the first-named operation the quantity of water required to benefit the tree or plant is great, much of the water being absorbed by the dry earth without benefiting the tree or plant. In the second operation the perforated tube being set a distance from the body of the tree or plant generally only reaches the roots of one side thereof, and unless a number of such tubes surround the tree or plant at uniform distances from each other the growth of the roots of such tree or plant will be irregular, the growth being the greatest in the direction of the water-supply pipe or tube.

One of the objects of my invention is to provide means whereby the tree or plant may be stimulated to put forth its roots symmetrically from the stem, it being obvious that the more evenly the roots radiate from the stem the more regular and rapid will be its growth, due to the fact that the elements of growth drawn from the earth will be brought from a more extended area and there will be less danger of a tree under which it has been used being uprooted.

In transplanting trees, shrubs, and plants in some localities a large percentage of them die for want of water. To prevent such loss, I apply the water directly to the under side of the roots through a coiled perforated tube placed in the bottom of the hole in which the tree or plant is to be set, the roots of the tree or plant being placed in direct contact therewith. The conduit is made of material of sufficient durability to last until the tree or plant has made enough headway in its growth to be out of danger of dying for want of moisture.

I accomplish the objects of my invention in the manner and by the means hereinafter more fully described in detail and claimed, reference being made to the drawings accompanying this specification, in which—

Figure 1 is a side elevation, partly in section, of my improved irrigating conduit and reservoir. Fig. 2 is a top plan view of the coiled tube with the supply-tube removed. Fig. 3 is a view of the entire device placed in position in a hole prepared for a tree and showing the roots in position on the coil.

In carrying out my invention I start with a tube made of tinned sheet metal and about one-fourth of an inch in diameter and having one of its ends *a* closed. This tube is turned back on itself at about one inch from the end *a* and carried around the closed end *a* and continued in the same direction, gradually rising from the starting-point as the coil is continued until the coil A is about eighteen inches in diameter and regularly concave on its upper side and convex on the lower. The tube rises at the point where the coil ends and on the outer circumference thereof for a distance of two feet of its length and at an angle of forty-five degrees outward from the circumference of the coil. This outwardly-inclined section B gradually increases in diameter from about one-fourth of an inch at the point where it starts from the coil to a diameter of four inches at its upper end, whence it rises vertically to a height of twelve inches, this vertical section C gradually increasing in diameter from four inches at its lower end to a diameter of six inches at its top, and has fitted thereon a lid or cover D, provided with a hinge E, secured to the side of the tube or reservoir. The coiled section A is provided with very small apertures *e* through the upper and lower sides of the tube thereof and about one inch apart thereon.

When the irrigating device is used, the hole for the tree, shrub, or plant is dug the proper depth and diameter and one corner or place cut away to receive the outwardly-projecting section of the tube B. The bottom of the hole may be formed concave to receive the convex coil. The tree, shrub, or plant is set on the central part of the coil and the dirt or soil thrown into the hole in the usual manner. The water is poured into the flared reservoir and slowly forces its way out through the apertures in the coil.

My irrigating device is of great value in localities subject to drought or where the place selected for planting trees, vines, shrubs, or plants is drier than the adjacent land by reason of the drainage thereof. With even a limited supply of water the life and growth of the young tree, vine, or shrub are protected from death or injury on account of drought and at an expense so small, when considered in connection with the cost and labor devoted to planting, that it renders the device of great value.

At the end of the summer's growth old rags or paper may be placed in the reservoir to shut off the cold air from the roots and allowed to remain there until time to commence irrigation the ensuing season.

For garden or hot-house use the irrigating apparatus may be constructed of more durable material than tin-plate in order that it may be reused after the plant or plants under which it is placed have arrived at maturity. For forcing the germination of seeds or the growth of plants the water used may be of as high a temperature as can be used without injury to such seeds or plants, and, if desired, fertilizers may be added to the water wherever the apparatus is used.

I have described a subirrigating conduit and reservoir of certain dimensions, but the dimensions may be varied and the inclination of the upwardly-extended flared portion may also be varied, or the latter may rise vertically from the circumference of the coil when the diameter of the latter is sufficient to allow the vertical construction without interference with the stem of the tree or plant.

By using a coil the water is distributed radially, the outer circumference of the coil first supplying the extremities of the longer roots, which extend horizontally, while the central portion of the coil will supply the more vertically-projecting roots of the tree, shrub, or plant.

Having thus described my invention, what I claim as new, and desire to secure by Letters Patent, is—

1. A subirrigating-conduit for use beneath the points of divergence of the roots from the stem of trees, vines, shrubs and plants consisting of a section of continuous perforated tubing closed at its lower inner end and coiled upward therefrom and having a tube and reservoir, for holding and supplying water, rising upwardly and outwardly from said perforate section, substantially as shown and described.

2. A subirrigating-conduit consisting of a concave convolute coiled perforate tube closed at its inner end and having attached to its outer circumference an upwardly-extended water-supply tube and reservoir, substantially as shown and described.

3. A subirrigating-conduit consisting of a perforate tube coiled upon itself having its inner end closed, a reservoir and water-supply tube connected with and rising from its outer coil, substantially as shown and described.

4. A subirrigation-conduit consisting of a coiled perforate tube of uniform diameter closed at its inner end and concentrically coiled therefrom to a distance, said coil rising slightly and uniformly and having a concave upper surface, said conduit rising outwardly from the circumference of said coil for a distance and increasing in diameter from its point of connection to said coil, thence rising vertically and flared from its junction with the outwardly-inclined section to its top and having a cover hinged thereto, substantially as shown and described.

In testimony whereof I hereto affix my signature in the presence of two witnesses.

RICHARD HOMER MEAD.

Witnesses:
   E. F. CADY, Sr.,
   NETTIE CADY.